United States Patent [19]
Gainsboro

[11] Patent Number: 6,064,963
[45] Date of Patent: May 16, 2000

[54] AUTOMATIC KEY WORD OR PHRASE SPEECH RECOGNITION FOR THE CORRECTIONS INDUSTRY

[75] Inventor: Jay L. Gainsboro, Framingham, Mass.

[73] Assignee: Opus Telecom, L.L.C., Framingham, Mass.

[21] Appl. No.: 08/992,123

[22] Filed: Dec. 17, 1997

[51] Int. Cl.[7] .................................................. G10L 15/04
[52] U.S. Cl. .......................... 704/270; 704/274; 704/251; 379/88.01
[58] Field of Search .................................... 704/201, 275, 704/251, 270, 273, 274, 259; 379/67, 88.11, 37, 38, 80, 88.01, 88.12, 188, 189

[56] References Cited

U.S. PATENT DOCUMENTS

| | | | |
|---|---|---|---|
| 5,033,088 | 7/1991 | Shipman | 704/275 |
| 5,535,261 | 7/1996 | Brown et al. | 379/88.11 |
| 5,651,056 | 7/1997 | Eting et al. | 379/88.01 |

*Primary Examiner*—David R. Hudspeth
*Assistant Examiner*—Abul K. Azad
*Attorney, Agent, or Firm*—Ward & Olivo

[57] ABSTRACT

The present invention comprises speaker-independent, continuous speech, multilingual, multi-dialect, Automatic Speech Recognition (ASR) technology. In particular, the present application integrates the ASR technology into call control technology such that it will identify key words in two ways. First, it will "Listen" to live conversations of any or all telephone lines controlled by the call control system. Second, it will "Listen" to recorded conversations of any or all voice recorder channels so that previously recorded telephone conversations can be quickly scanned to find key words or phrases spoken in the past. The unique aspect of this application is that it is being applied to the corrections industry for the purpose of spotting key words or phrases for investigative purposes or inmate control purposes which then can alert or trigger remedial action.

20 Claims, 1 Drawing Sheet

AUTOMATIC KEY WORD OR PHRASE SPEECH RECOGNITION FOR THE CORRECTIONS INDUSTRY

TECHNICAL FIELD OF THE INVENTION

The present invention relates to a system for providing automatic speech recognition integrated with a telephone control system and telephone recording system, specifically for the inmate/corrections industry. The current method for monitoring live and previously recorded inmate telephone conversations is extremely labor intensive, therefore being unnecessarily expensive and unreliable. A system for automating this process would save the correctional institutions money as well as improve the quality of the inmate control system.

BACKGROUND OF INVENTION

Speech recognition systems are well known to the art. Examples include the IBM Tangora ("A Maximum Likelihood Approach to Continuous Speech Recognition;" L. R. Bahl, F. Jelinek, R. Mercer; Readings in Speech Recognition; Ed.: A. Waibel, K. Lee; Morgan Kaufmann, 1990; pp. 308–319.) and Dragon Systems Dragon 30k dictation systems. Typically, they are single user, and speaker-dependent systems. This requires each speaker to train the speech recognizer with his or her voice patterns during a process called "enrollment". The systems then maintain a profile for each speaker who must identify himself or herself to the system in future recognition sessions. Typically speakers enroll via a local microphone in a low noise environment, speaking to the single machine on which the recognizer is resident. During the course of enrollment, the speaker will be required to read a lengthy set of transcripts, so that the system can adjust itself to the peculiarities of each particular speaker.

Discrete dictation systems, such as the two mentioned above, require speakers to form each word in a halting and unnatural manner, pausing between each word. This allows the speech recognizer to identify the voice pattern associated with each individual word by using preceding, and following silences to bound the words. The speech recognizer will typically have a single application for which it is trained, operating on the single machine, such as Office Correspondence in the case of the IBM Tangora System.

Multi-user environments with speaker dependent speech recognizers require each speaker to undertake tedious training of the recognizer for it to understand his or her voice patterns. While it has been suggested that the templates which store the voice patterns may be located in a common database wherein the system knows which template to use for a speech recognition by the speaker telephone extension, each speaker must none-the-less train the system before using it. A user new to the system calling from an outside telephone line will find this procedure to be unacceptable. Also, the successful telephonic speech recognizer will be capable of rapid context switches to allow speech related to various subject areas to be accurately recognized. For example, a system trained for general Office Correspondence will perform poorly when presented with strings of digits.

The Sphinx system, first described in the Ph.D Dissertation of Kai-Fu Lee ("Large Vocabulary Speaker and Dependent Continuous Speech Recognition: The Sphinx System;" Kai-Fu Lee; Carnegie Mellon University, Department of Electrical and Computer Engineering; April 1988; CMU-CS-88-148), represented a major advance over previous speaker dependent recognition systems in that it was both speaker independent, and capable of recognizing words from a continuous stream of conversational speech. This system required no individualized speaker enrollment prior to effective use. Some speaker dependent systems require speakers to be re-enrolled every four to six weeks, and require users to carry a personalized plug-in cartridge to be understood by the system. Also with continuous speech recognition, no pauses between words are required, thus the Sphinx system represents a much more user friendly approach to the casual user of a speech recognition system. This will be an essential feature of telephonic speech recognition systems, since the users will have no training in how to adjust their speech for the benefit of the recognizer.

A speech recognition system must also offer real time operation with a given modest vocabulary. However, the Sphinx System still had some of the disadvantages of the prior speaker dependent recognizers in that it was programmed to operate on a single machine in a low noise environment using a microphone and a relatively constrained vocabulary. It was not designed for multi-user support, at least with respect to the different locations, and multiple vocabularies for recognition.

Conventional speech processing systems commonly employ a speech recognition module which transforms input signals representing speech utterances into discrete representations that are compared to stored digital representations (templates) of expected words or speech sound units. The input speech signals are "recognized" usually by using a statistical algorithm to measure and detect a match to a corresponding word or sound template. Speech processing systems and algorithms are usually designed for one or more particular modes of operation, e.g., speaker-dependent or independent speech recognition, text- or application-dependent or independent speech recognition, speaker verification (authentication of identity), speaker recognition (selection from a number of candidates), or speaker monitoring (identity, direction, etc.). The design of such systems can vary widely with the application, speaker vocabulary, syntax, or environment of use.

Over the past several years, speech processing technology has achieved a level of performance sufficient to admit the introduction of successful commercial products. Development work continues to further improve the accuracy, reduce the vulnerability, and expand the capabilities of such systems. However, progress toward improvement has been limited by the available tools for system and algorithm development.

One factor limiting progress is that error rates have become low enough, for example, in text-dependent speaker verification, that a large test must be performed to ascertain whether an improvement has been made. To illustrate, if the probability of false acceptance is on the order of 1/1000, and the test is designed to observe 30 errors, then 30,000 trials are needed. Performing such a test using a simulation running on a time-sharing computer could take weeks or months. To mitigate this problem, tests may be run using a fast special-purpose hardware implementation of the recognition algorithm. However, this leads to a second problem, i.e. making changes to the algorithm may be very difficult because of the constraints imposed by the hardware or software.

A third important factor is that the recognition system itself influences the user's speaking behavior. This influence is absent if the user's speech input is prerecorded and the user does not have a real-time interaction with the system.

The environment in which the system is installed, the details of the user interface, and the feedback of past acceptance or rejection decisions can all affect the user's interaction with the system. Thus, valid testing in the intended environment of use requires a real-time implementation of the recognition algorithm and an accurate simulation of the user interface.

In many institutions the phone calls placed by a patient/client or prison inmate are primarily, if not exclusively, collect calls. Collect calls initiated by a patient/client must be indicated as such to the called party. In addition, calls placed by an inmate to an outside party often begin with a prerecorded message stating that the call or collect call is from "a prison" and is being placed by "prisoner's name." In the above cases the called party is usually asked to dial a digit, commonly a "0" or a "1", to accept the call or the attendant charges. The phone system providing such service must be able to detect such acceptance both as a dual-tone-multi-frequency ("DTMF") tone response from a "Touch-Tone" phone as well as to detect the equivalent response on a pulse-dial telephone. ("Touch-Tone" is a trademark of the AT&T corporation.)

The clients/inmates in some institutions may be allowed to call only numbers on a pre-authorized list in order to deter fraudulent activity. A prison phone system, for example, must be able to detect the called party's flashing the hook switch in order to prevent the called party from activating three-way (i.e., conference) calling, dialing another number and then connecting the prisoner to an unauthorized phone number.

Accordingly, a need has arisen for a telecommunications system which can automate and simplify the processes currently handled by a traditional automated operator service (AOS). Specifically, a need has risen for telephone call handling equipment which can automatically route local and long distance calls without the intervention of an outside service or live operator, and which enables the telephone owner/service provider to charge for the completion of a call or collect call while preventing three-way calling.

SUMMARY OF INVENTION

Currently, federal, state, and county correctional facilities are recording all telephone conversations of their inmates. These facilities record these conversations for two reasons: (1) To have a permanent record of the inmate phone conversations for future review should the facility need to find information which may be on the recordings. This includes information such as where inmates hide after escaping from prison, determining guilty parties for crimes committed within the institution, such as harassing phone calls, drug trade or other illegal activities, etc.; and (2) To allow correctional officers assigned to internal investigation or random monitoring duties to perform a regular review of the recordings.

Given that inmates generate a tremendous number of hours of calling per day (B number of phones×C number of calling hours per day×D percent of use time per phone), this can amount to hundreds of hours of random listening to various recordings on a regular basis. For example, if there are 32 phone lines being recorded and 12 calling hours per day and the average phone line is in use 90% of the time then this results in 345+hours of telephone recordings per 12-hour day.

The problem that exists is that correctional officers can only listen to a fraction of a day's recordings each day. Obviously this is extremely labor intensive since only one correctional officer labor-hour can be used to listen to one inmate conversation-hour at a time. Adding more officers to listen to enable more listening-hours per labor-hours is cost prohibitive, and adding more officers to search the recordings for critical investigations means that other officer duties are not being fulfilled.

In addition to being labor intensive, this manual process is highly error-prone. It may result in potentially missing a particularly important conversation that is in question or, at the very least, missing crucial elements of an important conversation.

The solution posed by the present invention is to apply speaker-independent, continuous speech, multilingual, multidialect, Automatic Speech Recognition (ASR) technology to the problems described above. In particular, applicant integrates the ASR technology into its own Call Control product such that it will identify key words or phrases in two separate ways. First, it will "Listen" to live conversations of any or all telephone lines controlled by the Call Control system. Second, it will "Listen" to recorded conversations of any or all voice recorder channels so that previously recorded telephone conversations can be quickly scanned to find any key words or phrases that were spoken in the past.

In a live conversation, the system will trigger an alert function which alerts a correctional officer to a potential problem and/or causes the telephone's functionality to be changed (i.e. phone conversations could be terminated, a recorded warning could be introduced into the line, a correctional officer could be patched into the conversation, etc.).

On the other hand, in a recorded conversation, the system would simply identify a locating parameter to allow the conversation to be found and listened to. Then the system either stops at the desired point and plays the recording and/or it logs the recording's location for future playback.

Currently, ASR technology is applied to problems involving specific word or phrase recognition for the purpose of gathering information for automated data entry, control of various types of telephone and computer systems, and related functions. The unique aspect of the present invention is that it is being applied to the corrections industry for the purpose of spotting key words or phrases for investigative purposes or inmate control purposes which can then alert a correctional officer or trigger an action to monitor or control the conversation.

Further objects and advantages of the present invention will become apparent from a consideration of the ensuing description and drawing.

BRIEF DESCRIPTION OF THE DRAWINGS

For a more complete understanding of the present invention, reference is now made to the following drawing, in which.

DETAILED DESCRIPTION OF THE PREFERRED EMBODIMENT

Figure 1:
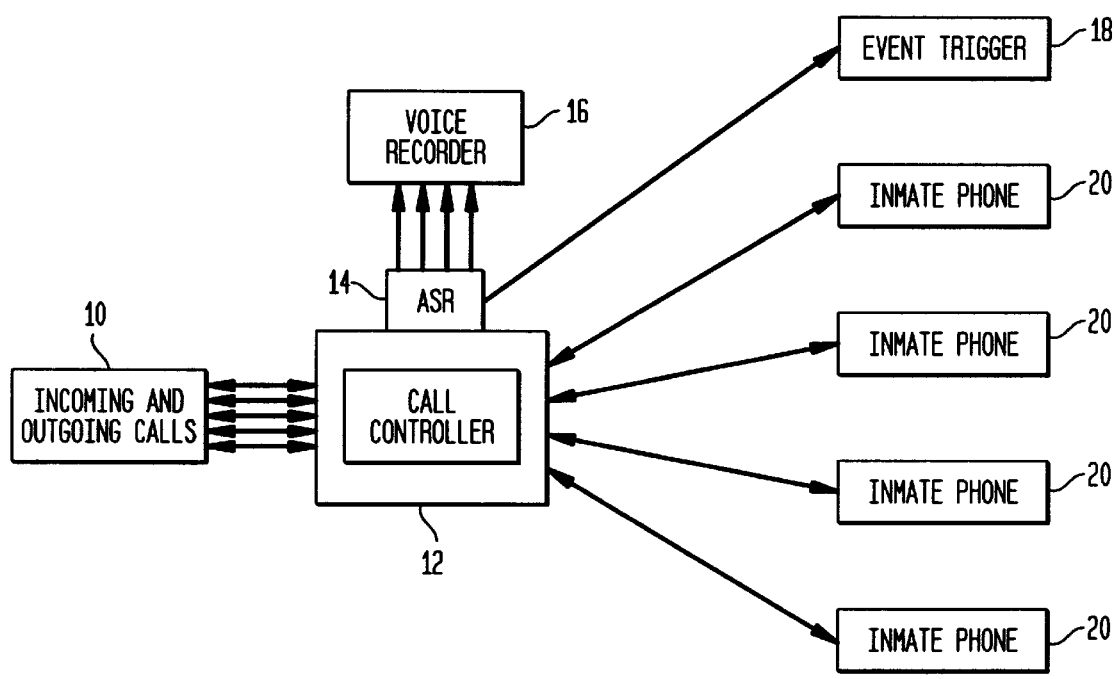
FIG. 1 shows a schematic representation of the method and apparatus of the present invention, more specifically the integration of automatic speech recognition technology into applicant's call controller technology for the specific use in the corrections industry.

The preferred embodiment of the present invention is set forth below.

FIG. 1 illustrates the present invention and its concepts which integrates automatic speech recognition (ASR) technology into call control technology such that it will identify key words or phrases in two ways. First, it will "Listen" to live conversations of any or all telephone lines controlled by the call control system. Second, it will "Listen" to recorded conversations of any or all voice recorder channels so that previously recorded telephone conversations can be quickly scanned to find key words or phrases spoken in the past.

The present invention is envisioned to be built as a buss compatible plug in board for IBM PC type platforms. Each card will contain a 30 channel TI interface with "T" logic for each channel. "T" logic, is the ability to take a single signal and direct it to 2 different locations simultaneously without attenuation of the signal. One side of the "T" will be used to pass the signal to the network. The other side of the "T" will be used to pass the signal to a recording device or other event driven process. The "T" switch will be capable of being configured as an open line (no signal passes), a straight through line (signal is passed directly through with no split out) and as a "T" stated above. Each of the lines is digitized and processed by the equivalent of a Digital Signal Processor, one per line. This type of intelligence will allow each processor to run the Voice Recording Devices according to defined and predefined patterns.

Said "T"'s will be configured as to what state to be in at any particular time via a control program which runs on a host PC. Such a control program can select lines to be monitored on a predefined rotation basis, from a stored table of selections or on a random basis.

The product would be integrated as a software module option (ASR Option) in the applicant's call control system. The ASR Option could be used with or without a voice recorder. If used without a voice recorder, ASR option could only be used to monitor Live conversations, real time. If used with a voice recorder, the ASR option could be used for both live and recorded conversations.

As shown in FIG. 1, inmates would initiate an outgoing phone call from inmate phone 20. The inmate's call would then be routed through call controller 12 before completion of the call to outgoing call 10 and the telephone company. At call controller 12, the inmate's call would be monitored by the ASR software option 14 and may be stored via attached voice recorder 16 (optional). The ASR option 14 would be monitoring for key words or phrases spoken during the conversation. If a key word or phrase is picked up by the ASR option 14, event trigger 18 is activated, thereby initiating the remedial action desired by the correctional institution. Conversely, if there is an incoming call 10 for an inmate, the incoming call 10 is routed through the call controller 12, where it would be monitored as described above, before connection to inmate phone 20.

Alternatively, the present invention can be used to monitor pre-recorded conversations in a similar manner as with live conversations. Here, the recorded conversation can be played and routed through call controller 12 where it would be monitored by the ASR option 14 which would search for key words or phrases in the conversation. The ASR option 14 would activate the event trigger 18 when a key word or phrase was found. A correctional officer can then be notified or the location can be marked for later uses.

The applicant's ASR option 14 would be configured such that an analog or digital connection would be made to the incoming or outgoing telephone line 10 and inmate phone 20. The call would originate from the inmate phone and be routed through the call controller system 12. If the call controller system 12 allows the call to be completed (i.e. connect attempt made to the called party) then the call gets sent to the telephone company for completion. Once the called party answers, the ASR option 14 and the voice recorder 16 would automatically be enabled. The ASR option 14 would be monitoring for key word or phrase utterances during the course of the live conversation. If a key word or phrase is "heard" by the ASR option 14, then an action would be initiated based on the configuration desired by the correctional institution administrator.

Given that ASR technology has key word or phrase quantity limits, applicant has developed a switching protocol whereby when one key word or phrase is "heard", a subset or subcategory of key words is accessed for further refinement of the identification process of the violation or conversation in process. While the conversation is being held, the voice recorder 16 could be recording the entire conversation as directed by the applicant's call control system 12.

In the event that the administrator needs to search for a conversation which may have occurred in the past and which is recorded by the recorder, the administrator would initiate a search criteria through an administrator application on the call control ASR unit. This search would scan the recordings of interest and identify the location, etc., of the key word or phrase located. The correctional officer would then have this information available to support any necessary actions taken.

The administration of the ASR option 14 would be through a Graphical User Interface (GUI). The administrator would be able to choose the desired key words by simply typing in the word or phrases they are trying to spot. To support multi-language capabilities for the same word or phrase, either the system would convert the key word or phrase to another language or the administrator would type in the equivalent words in the other languages desired. The administration application of the ASR feature would also provide the administrator with statistical analyses of the key word or phrase searches. In addition, the ASR module could selectively store conversations (live or previously recorded) and delete those of no further interest.

While the foregoing embodiments of the present invention have been set forth in considerable detail for the purposes of making a complete disclosure of the invention, it will be apparent to those of skill in the art that numerous changes may be made in such detail without departing from spirit and the principles of the invention.

What is claimed is:

1. An apparatus for providing an automatic speech recognition system for use in the corrections industry, said apparatus comprising:
   a call controller;
   an automatic speech recognizer having an event trigger;
   a plurality of first telephone connections; and
   a plurality of second telephone connections;
      wherein an inmate initiates an outgoing telephone call from one of said second telephone connections;
      wherein said outgoing telephone connection is routed through said call controller to one of said first telephone connections;
      wherein said call controller uses said automatic speech recognizer to monitor said outgoing telephone call;
      wherein said automatic speech recognizer searches for key words or phrases spoken during said outgoing telephone call; and
      wherein said event trigger is activated upon detection of said key words or phrases and a warning signal is initiated.

2. An apparatus according to claim 1, wherein said automatic speech recognizer monitors said outgoing telephone call in real-time.

3. An apparatus according to claim 1, wherein said apparatus further comprises voice recording means for selectively recording said outgoing telephone call.

4. An apparatus according to claim 3, wherein said automatic speech recognizer monitors a recording of said outgoing telephone call.

5. An apparatus according to claim 3, wherein said voice recording means is activated by said call controller based on the identity of said inmate.

6. An apparatus according to claim 1, wherein said automatic speech recognizer is multilingual and multidialectual.

7. An apparatus according to claim 1, wherein said automatic speech recognizer recognizes continuous speech.

8. An apparatus according to claim 1, wherein said automatic speech recognizer is speaker independent.

9. An apparatus according to claim 1, wherein said warning signal is triggered to a system administrator.

10. An apparatus according to claim 9, wherein said administrator can access said call.

11. An apparatus according to claim 9, wherein said administrator can terminate said call.

12. An apparatus according to claim 9, wherein said administrator can initiate a recording to be played during said call.

13. An apparatus according to claim 1, wherein said automatic speech recognizer comprises a switching protocol wherein a subset of key words is accessed upon triggering of said event trigger.

14. An apparatus according to claim 1, wherein said automatic speech recognizer provides statistical analysis of said key word or phrase searched.

15. An apparatus according to claim 1, wherein said warning signal is a prerecorded statement.

16. An apparatus according to claim 1, wherein said outgoing telephone call is terminated automatically upon activation of said event trigger.

17. An apparatus according to claim 4, wherein said recorded conversations are reviewed by said automatic speech recognizer, and wherein an action is initiated by an administrator when said automatic speech recognizer recognizes a key word or phrase.

18. An apparatus according to claim 17, wherein said action is notification of a correctional officer.

19. An apparatus according to claim 17, wherein said action is storing the call for future playback.

20. An apparatus for providing automatic speech recognition, said apparatus comprising:

at least one first telephone connection;

at least one second telephone connection;

call control means for controlling the monitoring of telephone conversations between said first telephone connection and said second telephone connection;

speech recognition means for monitoring said telephone conversations, said speech recognition means having means for activating a warning signal; and recording means for recording said telephone conversations;

wherein said telephone conversations are initiated by an inmate from said second telephone connection which is routed through said call control means to said first telephone connection;

wherein said call control means uses said speech recognition means to search said telephone conversations for key words or phrases; and wherein said warning signal is activated by said means for activating upon detection of said key words or phrases.

* * * * *